Jan. 3, 1956  S. SAUL, JR  2,729,342
PALLET RACKS
Filed Nov. 1, 1951
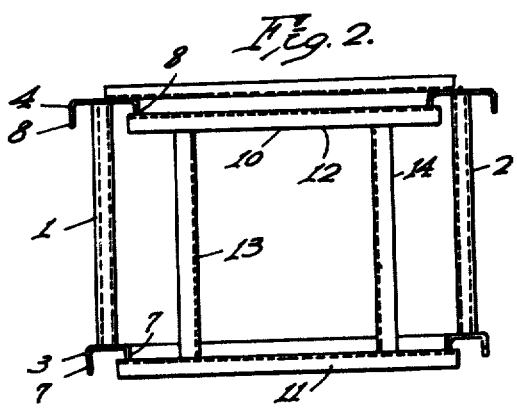
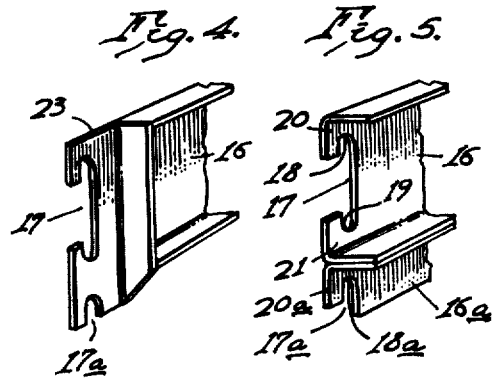
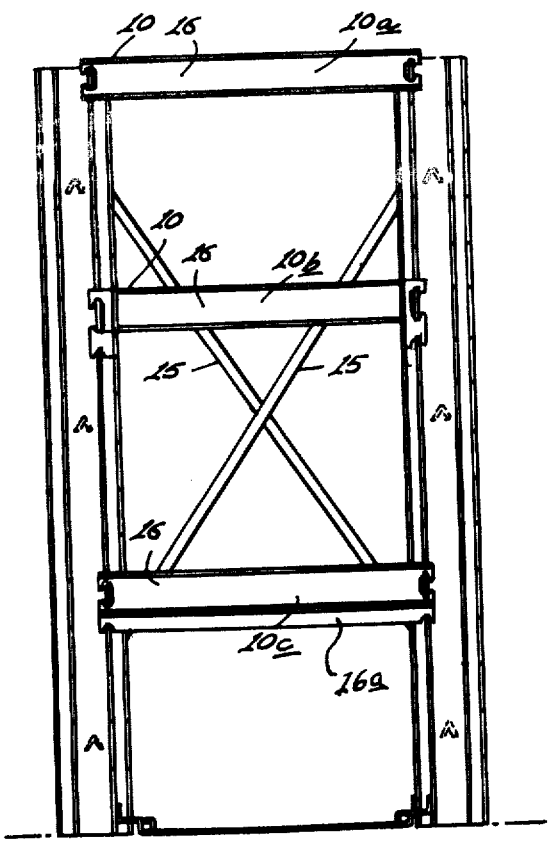
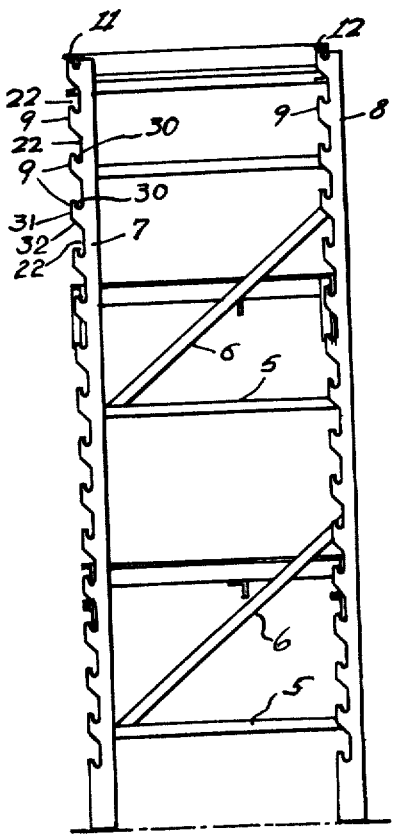
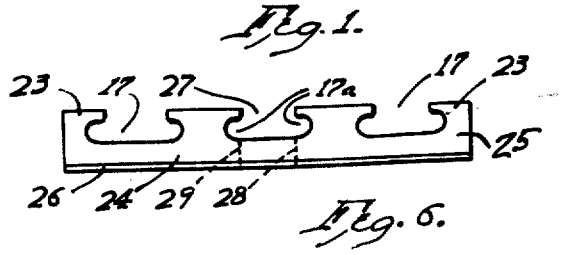
INVENTOR.
Samuel Saul, Jr.
BY
Christy, Parmelee & Strickland
his ATTORNEYS › # United States Patent Office 2,729,342
Patented Jan. 3, 1956

2,729,342

PALLET RACKS

Samuel Saul, Jr., Pittsburgh, Pa.

Application November 1, 1951, Serial No. 254,425

3 Claims. (Cl. 211—147)

This invention relates to a storage rack for material handling pallets.

The use of pallets in connection with material handling operations has become increasingly common. Such pallets are generally provided with a material supporting surface which is elevated to provide space for the reception of the arms of a fork-lift truck for lifting and transporting the pallet and materials carried thereby. The pallets may be either of the flat type for handling articles which may be stacked thereon, or may be provided with collapsible side walls for containing articles of irregular shape therein. Either type is usually arranged so that the pallets and materials carried thereby may be stacked in superimposed relation to thereby occupy a minimum of space.

The use of pallets expedites the handling of materials and the stacking feature conserves space. However, in many cases, it is frequently necessary to have immediate access to the materials on a given pallet such as for the purpose of performing machining or working operations on such materials. In the event that a given pallet is in a stacked pile of pallets and located adjacent the bottom of the pile, it is necessary to remove the pallets overlying the given pallet before access thereto may be had. It is thereafter necessary to restack the pallets which were removed to provide access to the given pallet. Obviously, this condition results in a considerable expenditure of time, and an undesirable increase in the cost of the material handling operation.

In machine shops and other places where pallets are used for handling materials on which a series of working operations are to be performed, supporting structures having shelves providing individual supports for pallets have been employed in order to eliminate the handling cost due to the stacking and unstacking of a plurality of pallets incident to gaining access to a given pallet. By reason of the size of the pallets and the weight of the articles carried thereon, such structures must be very large and capable of carrying extremely heavy loads. Such structures are commonly constructed of permanently connected shelves and supports which when once installed are incapable of being moved to another position. With permanent pallet structures of this nature, a fork-lift truck used for moving the pallet is frequently required to travel a long distance in order to transport the materials to a point where the working operation is to be performed thereon. In order to avoid the necessity of having a fork-lift truck travel over such long distances, it has been necessary to provide supporting structures of the character referred to located at strategic points thereby resulting in inefficient use of the permanent structures and the use of considerable floor space.

One of the principal objects of this invention is to provide a rack for storing loaded pallets in which the individual parts thereof may be readily taken apart and reassembled where needed. To this end, the rack is comprised of upright supports on which shelves are removably mounted in such manner that the shelves are utilized to secure the uprights in their vertical positions and to brace such uprights against movement out of such position. In a manner to be described, the structure by which the shelves are secured to the uprights is arranged so that the shelves may be assembled and disassembled with respect to the uprights while supported in a horizontal position on the arms of a fork-lift truck.

A further object of the invention is to provide a rack structure of the character described in which the shelves may be moved to and from an operative position for supporting engagement with the uprights by a straight forward or rearward movement of the shelves with respect to the uprights while supported on the arms of a fork-lift truck. To this end, each of the uprights comprises front and rear supporting standards respectively including a pair of spaced forwardly projecting notched flanges, the notching of the flanges providing hooks on which the shelves may be supported. The flanges on the rear standards are spaced apart further than the flanges on the front standards for supporting engagement with the fastening elements at the rear edges of the shelf which are spaced apart a distance less than the notched flanges on the front standards so that they will clear the front standards in being moved rearwardly to a position for engagement with the rear standards.

Another object of the invention is to provide an improved arrangement of fastening and mounting structure at the corners of the shelves for interlocking and supporting engagement over the hooks provided by the notched flanges of the supporting standards. This improved mounting and fastening structure comprises a notched plate, the notch being of substantially a T-shape, which may be projected into the space between vertically spaced hooks on the standards and thereafter lowered vertically into supporting engagement thereon. The mounting and fastening structure on the ends of the shelves is so constructed that it will form an interlock with the hooks provided by the notched flanges, there being, in a manner to be referred to, sheets of metal intersecting at substantially right angles at the point of connection when the interlock is effected by movement of the shelves vertically to a position supported on the hooks of the uprights.

A still further object of the invention is to provide mounting structure at the four corners of a shelf of the character described which includes a metal plate having an opening in the end thereof through which the supporting hooks of a vertical standard may be projected by a horizontal movement of the shelf with respect to the standards so that the shelf may be positioned for supporting engagement on the four standards by observing the position of the hooks on the front standards with respect to the mounting openings at the front corners of the shelves.

Other objects and advantages of the invention will become apparent from the following description.

In the drawings there is shown a preferred embodiment of the invention. In this showing:

Fig. 1 is a front elevational view of a pallet rack constructed in accordance with the principles of this invention;

Fig. 2 is a plan view of the rack shown in Fig. 1;

Fig. 3 is a side elevational view of the rack shown in Fig. 1;

Fig. 4 is an enlarged fragmentary perspective view of the mounting structure at one corner of one of the shelves shown in Fig. 1;

Fig. 5 is an enlarged fragmentary perspective view of the mounting structure at a corner of another of the shelves shown in Fig. 1 and illustrating a modified form of mounting structure; and Fig. 6 is an enlarged elevational view of a notched angle section which is utilized in the fabrication of two mounting structures of the type shown in Fig. 4.

In the drawings, the numerals 1 and 2 designate respectively a pair of vertically extending uprights which are of identical construction. Each of the uprights 1 and 2 comprises a vertically extending front standard 3 and a vertically extending rear standard 4, the standards 3 and 4 being secured in spaced relation by angle bracing sections 5 and 6. The standards 3 and 4 are channel sections respectively having forwardly projecting and parallel flanges 7 and 8 which are notched at uniformly spaced intervals to provide a plurality of equally spaced and upwardly projecting hooks 9 therealong. Such notches 22 provide each hook 9 with an upper recessed portion 30, a front portion 31 and an inwardly inclined bottom portion 32. For a purpose to be described, the flanges 8 on the rear standards 4 are spaced apart a distance greater than the flanges 7 on the front standards 3.

The shelves are designated as a whole by the numeral 10 and are comprised of front and rear parallel structural sections 11 and 12 which are secured together in spaced relation by parallel angle sections 13 and 14. The ends of the structural sections 11 and 12 project beyond the edges of the shelf, the front section 11 having an overall length greater than the spacing between adjacent flanges 7 of a pair of front uprights 3 and the rear section 12 having an overall length greater than the spacing between adjacent flanges 8 of a pair of rear uprights 4. In addition, the overall length of the rear shelf section 12 is less than the distance between adjacent flanges 7 of a pair of front uprights 3 so that the ends of the rear section 12 may clear the front uprights 3 during a rectilinear and horizontal movement of the shelf 12 rearwardly to a position for supporting engagement on the hooks 9.

The uprights 1 and 2 are secured in spaced relation by bracing members 15 extending between and secured to the webs of the rear channels 4.

As illustrated in Figs. 1 and 3, the shelves 10 may have the structure designated by the numerals 10a, 10b and 10c. Referring first to the shelf designated by the numeral 10a, the front and rear structural sections 11 and 12 are channel sections respectively having a vertically extending web 16. In the case of the shelf 10a, each end of the web 16 is provided with a T-shaped slot 17 having semi-circular ends 18 and 19 as best shown in Fig. 5. The ends 18 and 19 are spaced apart a distance such that the hooks may be moved through the opening provided by the slot 17 in the web 16 upon movement of the shelf rearwardly to a position for supporting engagement on the hooks 9. Upon movement of the shelf rearwardly to a position for supporting engagement in this manner, the web sections 20 and 21 forming the notch ends 18 and 19 are projected into adjacent notches 22 in the flanges 7 or 8 as the case may be, there being a supporting hook 9 between such notches which projects through the notched opening 17. The shelf may thereafter be lowered into supporting engagement on the hooks 9. When so lowered into supporting engagement, the bight of the notch end 18 engages in the semi-circular bight 23 of the hook 9 to form an interlock therewith which rigidly braces the shelf against lateral movement with respect to the uprights and secures the uprights against forward or rearward movement with respect to the shelf, the interlock being formed by the metal of the web 16 and flanges 7 and 8 extending at right angles to and intersecting with each other.

The assembly of the shelf 10a on the uprights 1 and 2 may be effected by movement of the shelf while supported on the arms of a fork-lift truck. Due to the overall length of the structure section 12 being less than the distance between adjacent flanges 7 on the front standards 3, the shelf may be moved directly rearwardly to a position for supporting engagement on the rear standards 4 without interference from the front standards 3. This rearward movement of the shelf is effected by moving the fork-lift truck forwardly while the shelf 10 is supported on the arms thereof. After the rear section 12 has been moved rearwardly to a position clearing the front standards 3, the operator of the fork-lift truck need pay no further attention to the rear section 12 of the shelf. The operator need only manipulate the shelf until the notches 17 at the ends of the front section 11 are moved to a position with selected hooks 9 on the front standards 7 projecting therethrough. When hooks 9 on the front standards 8 are observed to move through openings 17 at the ends of the front shelf section 11, a similarly arranged pair of hooks 8 on the rear standards 4 will move through openings 17 at the ends of the rear channels 12. The horizontal movement of the shelf to a position for supporting engagement on hooks 9 at each of the four corners thereof is thus effected by the operator while observing only the front section 11 of the shelf.

The shelf 10c is identical to the shelf 10a with the exception that the section 16 has an angle iron 16a secured to the bottom side thereof. The angle section 16a, as best shown in Fig. 5, has a notch 17a similar to the upper half of the notch 17. The notch 17a has parts 18a and 20a similar to the parts 18 and 20 for supporting engagement over a second hook 9, the notch ends 18 and 18a being spaced apart a distance equal to the vertical spacing of adjacent hooks 9. The provision of the angle section 16a enables the shelf 10c to be supported by adjacent pairs of vertically spaced hooks 9 on each of the standards 3 and 4 thereby providing a more rigid and rugged rack assembly. The lower section 16a may be formed by cutting a channel section 16 longitudinally and centrally thereof to thereby form two angles 16a. In the preferred practice of the invention, however, the lower section 16a is fabricated from an angle section.

In place of forming the notches 17 and 17a in the ends of channel sections 16, the notches 17 and 17a may be formed in an angle section 23 as illustrated in Fig. 4, and in the manner shown in connection with the shelf 10b of Figs. 1 and 3. In such case, the ends of the channel sections 16 are cut off, and the angle sections 23 having notches 17 and 17a formed therein are welded to the ends of the channel section, each of the sections 11 and 13 in such case being formed of a channel section 16 and an angle section 23 welded to each end thereof. The manner of fabrication of the end angle sections 23 with the notches 17 and 17a will be best understood by referring to Fig. 6 wherein the numeral 24 designates an angle section comprised of flanges 25 and 26 extending at right angles to each other. The flange 25 is then punched to form two T-shaped notches 17 therein and a central T-shaped notch 26. The portion of the angle section 24 between the dotted lines 28 and 29 is then removed to divide the section 24 into two end pieces 23 respectively having a T-shaped notch 17 and a lower notch 17a. In this manner, one angle section 24 is utilized to form the end mounting structures 23 for each end of a channel section 16 as illustrated in Fig. 4 and shown in connection with the shelf 10b in Figs. 1 and 3.

From the foregoing, it will be apparent that the shelves 10 when constructed as described above, will serve to reinforce the uprights against movement with respect to the shelves. Moreover, the assembly of the shelves 10 on the supporting standards is effected quite easily while the shelves are supported on the arms of a fork-lift truck. Horizontal movement of the shelves to a position for supporting engagement over selected ones of the hooks 9 is effected without movement of the shelf 10 out of a horizontal plane. It will also be noted that final movement of the shelf to its supported position interlocked with the uprights 3 and 4 is accomplished by merely lowering the shelf in a vertical direction. Disassembly of the shelf can be readily effected by a reverse vertical and horizontal movement. Attention is further directed to the fact that in effecting assembly and disassembly of the shelf on the uprights 3 and 4, the operator of the fork-lift truck carrying the shelf need observe the relative movement of the hooks 9 with respect to the openings 17 at the ends of the front shelf structure sections 11.

Certain features of the pallet rack herein shown and described are common to my copending application Serial No. 50,956, filed September 24, 1948, now Patent No. 2,577,276, issued December 4, 1951, to which reference is hereby made.

While I have illustrated and described several specific embodiments of my invention, it will be understood that this is merely by way of illustration, and that various changes and modifications may be made therein within the contemplation of my invention and under the scope of the following claims.

I claim:

1. An adjustable supporting rack for heavily loaded receptacles comprising a frame having four parallel spaced uprights arranged in two pairs, one pair being forwardly of the other, each of said uprights comprising a web portion and a forwardly projecting flange portion having notches at vertically spaced intervals providing a plurality of upwardly pointing hooks, the flange portions of each pair of uprights being in opposing relation with the flanges of the front uprights spaced a greater distance than the flanges of the rear uprights, and a shelf having front and rear structural sections the ends of which protrude beyond the sides of the shelf in overlapping relation to the respective upright flanges at the front and rear of the rack, each hook on each upright flange having a front portion and an inwardly inclined bottom portion directed towards the upright web, the ends of each of said shelf front and rear structural sections including a vertical plate portion having a T-shaped notched opening extending inwardly from the outer vertical edge thereof with the head of the notched opening of a vertical length to pass the flange hook front portion and inclined bottom portion with the shelf plate portion engaging with the unnotched portion of the upright flange, said plate opening having supporting engagement on said hook with the upper edge of said plate opening and the lower edge of said flange notch engaged and forming an interlock between said plate and flange, the lower edge of said plate opening restricting vertical upward displacement of the shelf by engaging the inclined hook bottom portion.

2. The invention defined in claim 1 characterized by a second notched opening in said vertical plate disposed in vertically spaced relation to the first notched opening and engaging the adjacent lower hook of the associated upright flange.

3. An adjustable rack and shelf assembly adapted for insertion of the loaded shelves by means of a lift truck restricted to imparting vertical and horizontal movements to the shelves, comprising a frame having at least four parallel spaced uprights arranged in pairs, one pair being forwardly of the other and the forward pair being spaced apart a greater distance than the other pair, a vertically adjustable shelf supported on said uprights and having front and rear structural sections the ends of which project beyond the sides of the shelf and are of an overall length greater than the spacing between the respective pairs of uprights upon which they are supported, the rear structural shelf section having an overall length less than the spacing between the front pair of rack uprights permitting the shelf to be inserted between said latter uprights in a horizontal plane, means on said front and rear structural shelf sections which overlap the uprights and on the overlapped portions of each upright for adjustably supporting the shelf in a plurality of vertically spaced portions, said means at each end of each shelf structural section comprising horizontally engaging opposing hooks and elongated openings interlocking upon vertical lowering of the shelf to resist horizontal separation of the shelf and uprights while providing vertical support for each end of the shelf upon its adjacent upright, at least one hook of each said pair having a portion of the front face thereof sloping inwardly and transversely of the adjacent hook bearing portion, the opposing surfaces of the sloping hook portion and elongated opening upon engagement restricting vertical displacement of the shelf.

References Cited in the file of this patent

UNITED STATES PATENTS

| | | |
|---|---|---|
| 360,547 | Winslow | Apr. 5, 1887 |
| 515,163 | Pauly et al. | Feb. 20, 1894 |
| 1,031,216 | Warner et al. | July 2, 1912 |
| 1,235,679 | Gerberich | Aug. 7, 1917 |
| 1,288,010 | Isaac | Dec. 17, 1918 |
| 1,366,743 | O'Connor | Jan. 25, 1921 |
| 1,473,817 | Gorsline | Nov. 13, 1923 |
| 2,160,174 | Scalera | May 30, 1939 |
| 2,566,541 | Travis | Sept. 4, 1951 |
| 2,577,276 | Saul | Dec. 4, 1951 |

FOREIGN PATENTS

| | | |
|---|---|---|
| 334,372 | Great Britain | Sept. 4, 1930 |

UNITED STATES PATENT OFFICE
CERTIFICATE OF CORRECTION

Patent No. 2,729,342            January 3, 1956

Samuel Saul, Jr.

It is hereby certified that error appears in the above numbered patent requiring correction and that the said Letters Patent should read as corrected below.

Column 6, lines 21 and 22, for "portions" read -- positions --.

Signed and sealed this 1st day of September 1964.

(SEAL)
Attest:

ERNEST W. SWIDER            EDWARD J. BRENNER
Attesting Officer            Commissioner of Patents